United States Patent
Koch et al.

(10) Patent No.: US 11,593,445 B2
(45) Date of Patent: Feb. 28, 2023

(54) SOCIAL COMMUNITIES ASSISTANT

(71) Applicant: AT&T Intellectual Property I, L.P., Atlanta, GA (US)

(72) Inventors: Robert Koch, Peachtree Corners, GA (US); Nikhil Marathe, Palatine, IL (US); James Pratt, Round Rock, TX (US); Ari Craine, Marietta, GA (US); Eric Zavesky, Austin, TX (US); Timothy Innes, Atlanta, GA (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 274 days.

(21) Appl. No.: 16/710,598

(22) Filed: Dec. 11, 2019

(65) Prior Publication Data
US 2021/0182354 A1  Jun. 17, 2021

(51) Int. Cl.
G06F 16/9538 (2019.01)
G06F 16/9535 (2019.01)
G06F 16/2455 (2019.01)
G06F 16/25 (2019.01)
G06F 16/9536 (2019.01)

(52) U.S. Cl.
CPC .... *G06F 16/9538* (2019.01); *G06F 16/24556* (2019.01); *G06F 16/258* (2019.01); *G06F 16/9535* (2019.01); *G06F 16/9536* (2019.01)

(58) Field of Classification Search
None
See application file for complete search history.

(56) References Cited

U.S. PATENT DOCUMENTS

| | | | |
|---|---|---|---|
| 8,332,476 | B2 | 12/2012 | Abramson et al. |
| 8,539,360 | B2 | 9/2013 | Angell et al. |
| 9,123,081 | B2 | 9/2015 | Young et al. |
| 9,154,605 | B2 | 10/2015 | Stovicek et al. |
| 9,306,927 | B2 | 4/2016 | Vernal et al. |
| 9,384,230 | B2 | 7/2016 | Jana et al. |
| 9,424,611 | B2 | 8/2016 | Kanjirathankal et al. |

(Continued)

FOREIGN PATENT DOCUMENTS

| WO | WO 2014/059426 A2 | 4/2014 |
|---|---|---|
| WO | WO 2016/080699 A1 | 5/2016 |

OTHER PUBLICATIONS

"What does Buffer do?"; https://buffer.com/faq; Buffer; 2015; 2 pages.

(Continued)

*Primary Examiner* — Amresh Singh
(74) *Attorney, Agent, or Firm* — Guntin & Gust, PLC; Kenneth Kwan

(57) ABSTRACT

A social communities assistant system may serve as a proxy for a user when communicating with social networking communities. The user may have a single interface on, such as an application, to communicate with a plurality of social communities. As a proxy, the social communities assistant system may manage parallel communications among the social communities on behalf of the user. The social communities assistant system may manage communications of various types. These types of communication may include queries, responses, statements, event notifications, or actions, among other things.

20 Claims, 5 Drawing Sheets

(56) References Cited

U.S. PATENT DOCUMENTS

| | | |
|---|---|---|
| 9,436,966 B2 | 9/2016 | Vanscoyk et al. |
| 9,495,710 B2 | 11/2016 | Wong et al. |
| 9,589,205 B2 | 3/2017 | Joshi et al. |
| 9,614,808 B1 | 4/2017 | Dodsworth |
| 9,818,161 B2 | 11/2017 | Voas et al. |
| 9,836,798 B2 | 12/2017 | White et al. |
| 10,135,776 B1 | 11/2018 | Brown et al. |
| 10,255,351 B2 | 4/2019 | Newman et al. |
| 11,128,994 B1* | 9/2021 | Sharp .................. H04W 12/06 |
| 2008/0288582 A1 | 11/2008 | Pousti et al. |
| 2011/0047229 A1* | 2/2011 | Sinha ..................... G06F 9/543 |
| | | 709/206 |
| 2011/0302099 A1 | 12/2011 | Jeffries |
| 2013/0047089 A1 | 2/2013 | Kulathungam |
| 2014/0173461 A1 | 6/2014 | Shahade et al. |
| 2015/0142486 A1 | 5/2015 | Broady et al. |
| 2015/0149556 A1 | 5/2015 | Liu et al. |
| 2015/0170294 A1 | 6/2015 | Goyal et al. |
| 2016/0255139 A1* | 9/2016 | Rathod ................. H04L 51/046 |
| | | 709/203 |
| 2016/0307277 A1 | 10/2016 | Wengrower |
| 2020/0036548 A1* | 1/2020 | DeLanghe ............ H04L 65/403 |
| 2020/0053035 A1* | 2/2020 | Mukherjee .............. G06F 40/40 |

OTHER PUBLICATIONS

"Social Media Engagement App—Post Planner"; https://www.postplanner,com/; Post Planner, Inc.; 2011-2016; 14 pages.
"Hoo's Using Hootsuite?"; https://hootsuite.com; HootSuite; 2009; one page.

* cited by examiner

SOCIAL COMMUNITIES ASSISTANT

BACKGROUND

The popularity of social networking sites such as Facebook®, Twitter®, MySpace®, LinkedIn®, etc., are increasing. Social networking sites allow a subscriber to share personal content and information, status or location information. In doing so, the subscriber must log into each site and manually enter what the content they want to share, their personal information or any updates to what they are doing.

In other words, a common feature of these social networking sites is that the subscriber must repeatedly and manually input information to update these social networking sites. In other words, the social network sites are only as good as the most recent information that is posted by the subscriber. This requires a large commitment of time and effort from the subscriber.

However, repeatedly updating the subscriber information in these social networking sites is a laborious process. Eventually, this cumbersome process leads to a disinterest in these social network sites as subscribers become lazy or simply do not feel like constantly updating their information. This leads to stale information on these social network sites.

This disclosure is directed to addressing issues in the existing technology. This background information is provided to reveal information believed by the applicant to be of possible relevance. No admission is necessarily intended, nor should be construed, that any of the preceding information constitutes prior art.

SUMMARY

This disclosure describes subject matter associated with the problems caused by a user being a member of multiple social communities and the difficulty of managing the use of them. For example, a user may want to communicate with more than one of the social communities the user is subscribed to using a single input communication. The single input communication may be intelligently tailored to target or skip the appropriate social community.

In an example, an apparatus may include a processor and a memory coupled with the processor that effectuates operations. The operations may include obtaining first information associated with posting on a plurality of social community servers, wherein the plurality of social community servers comprises different types of social media, wherein a profile of a user is associated with each of the plurality of social community servers; obtaining second information associated with the profile of the user, wherein the second information comprises location of a mobile device associated with the user; based on the first information and the second information, determining a subset of the plurality of social community servers for the posting; and sending the posting associated with the first information to the subset of the plurality of social community servers. The posting may include parts of the first information or the first information in different text, audio, or graphic formats.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

This disclosure describes subject matter associated with the problems caused by a user being a member of multiple social communities and the difficulty of managing the use of them. For example, a user may want to communicate with more than one of the social communities the user is subscribed to using a single input communication. The single input communication may be intelligently tailored to target or skip the appropriate social community.

Figure 1:
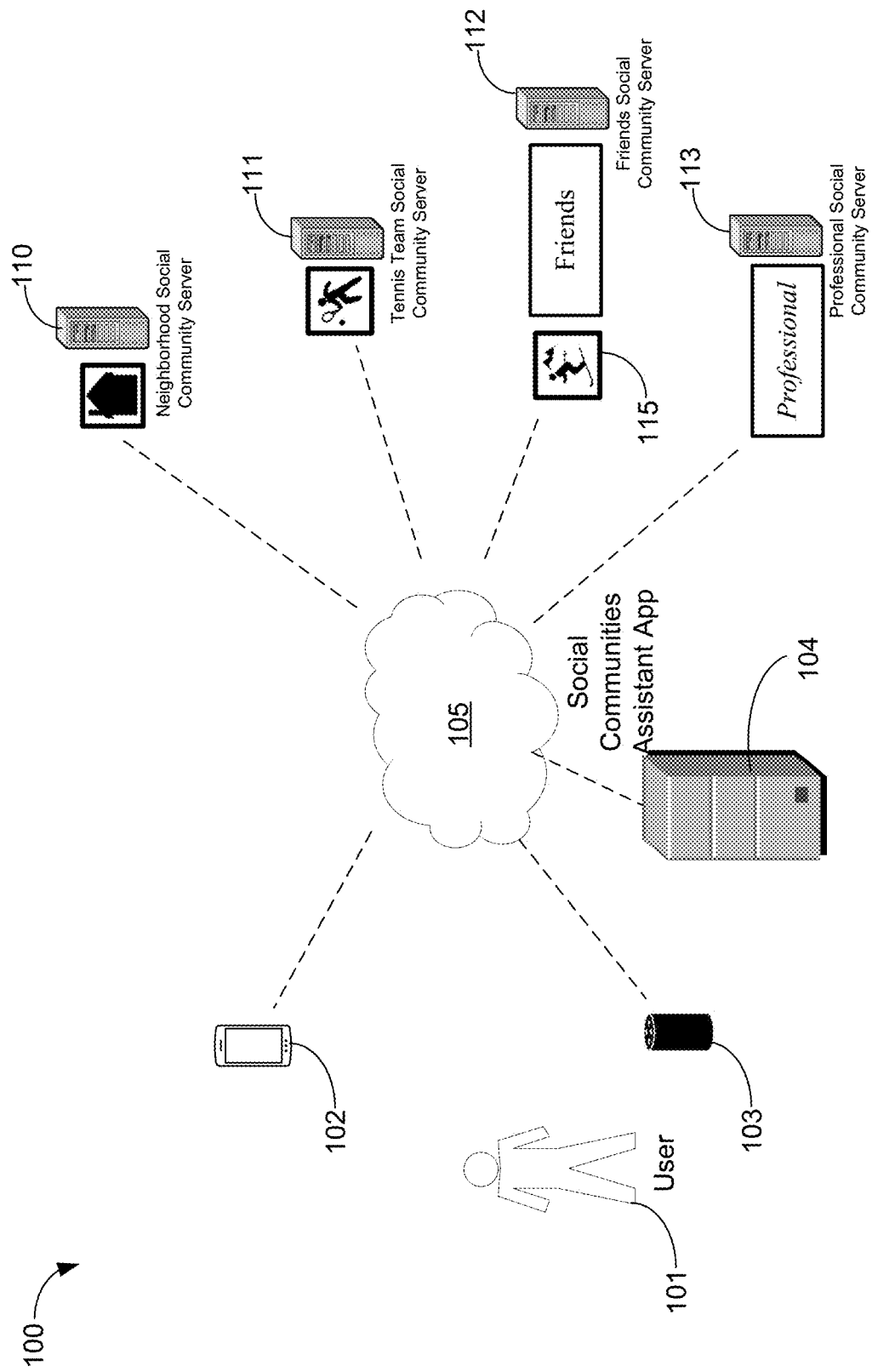
FIG. 1 illustrates an exemplary system for implementing a social communities assistant.

FIG. 1 illustrates an exemplary system 100 for implementing a social communities assistant. User 101 may utilize mobile device 102, device 103 (e.g., smart speaker), or another device to interact with a social communities assistant application. The functions of a social communities assistant application may be located on one device (e.g., server 104) or distributed over a plurality of devices, which may be wired or wireless. Server 104 may store the profile of user 101 or mobile device 102. System 100 may include a plurality of different types of social community servers in which user 101 is a member, such as server 110, server 111, sever 112, or server 113. Server 110, in this example, may be a neighborhood social community server 110, server 111 may be a tennis team social community server 111, server 112 may be a friends social community server 112, or server 113 may be a professional social community server 113. As disclosed in more detail, each social community server may include respective community profiles for the social community.

Mobile device 102 or device 103 may include, wireless devices, such as satellite communication systems, portable digital assistants (PDAs), laptop computers, tablet devices, smart phones, smart watches, smart speakers, automobiles (e.g., autonomous vehicles), augmented reality devices, virtual reality devices, virtual assistants, or the like. Mobile device 102 or device 103 may include sensors such as an environmental sensor, acoustic sensor, sound sensor, vibration sensor, fluid sensor, optical sensor, position sensor (e.g., accelerometer or gyroscope), speed sensor, chemical sensor, pressure sensor, camera, or the like. The sensors may be a separate device or integrated into a device.

User 101 may engage with the plurality of social community servers (e.g., social networking communities) by mobile device 102 or device 103. Mobile device 102 may be a smartphone and device 103 may be a smart speaker. A virtual assistant may reside on mobile device 102 or device 103. Conventionally, users interact with social networking communities in a serial 1-to-1 manner. For example, conventionally, user 101 may communicate with friends social community server separately from the professional social community server. Disclosed herein is a social communities assistant system which may serve as a proxy for user 101 when communicating with social networking communities. User 101 may have an interface on mobile device 102, such as application, to communicate with the social communities assistant system. As a proxy, the social communities assistant system may manage parallel communications among the social community servers on behalf of user 101. The social communities assistant system may manage communications of various types between mobile device 102 (e.g., associated with user 101) and the associated social networking communities. These types of communication may include queries, responses, statements, event notifications, or actions, among other things.

With continued reference to FIG. 1, in an example, social assistant server (SAS) 104 (e.g., server 104), mobile device 102, device 103, or devices of system 100 may be communicatively connected with each other in order to obtain or provide information associated with user 101, which may be a user of mobile device 102. SAS 104 may obtain information from any of the devices of system 100 to help manage the disclosed social communities assistant of system 100. Mobile device 102 may be used to monitor user 101 and gather or disseminate information such as user profile information, health information, user movement information, or the like. It is contemplated herein that the functions of the devices of system 100 may be combined into one device or distributed over multiple devices.

SAS 104 may store or otherwise have access to profile data of user 101 (e.g., user profile data). The profile data of user 101 may include a plurality of user profile representations for how user 101 is characterized for each of the communities in which user 101 participates. For instance, for friends social community server 112, the data may include names of a list of friends, the corresponding contact information of the list of friends, or data that characterizes user 101 that is of a more casual nature, such as relationship status of user 101, types of music user 101 likes, typical emotional nature of user 101 (e.g., quiet during the week, enjoys weekend trips or parties). This data of social community server 112 may be considered to be static profile data for the friends social community. Professional social community server 113 might include different types of data (e.g., static profile data) such as job history, professional certifications, or companies user 101 has been employed by. Some data may be common across communities—e.g., colleges attended may be stored for both friends social community and professional social community.

Dynamic profile data about user 101 may also be derived and stored in a database associated with SAS 104. The profile data may include current biometric data received from user 101, data indicating the activity level of user 101 (e.g., number of steps, heart rate, etc.), environmental surroundings data (e.g., weather, humidity, or temperature), or location data of user 101, among other things. The dynamic profile data may be used to infer current conditions of user 101. For instance, SAS 104 may compare the current location of user 101 with locations frequented by user 101 to infer that user 101 is in "work mode" if at their office, in "parent mode" if at their child's school, or in "child mode" if at their parents' retirement home. Biometric data may be used to infer that the user is exercising or sleeping, for example. Environmental surroundings data may be detected by mobile device 102 and sent to SAS 104. For instance, user 101 may be in a noisy environment, such as at an outdoor concert.

SAS 104 may perform analysis on media associated with user 101 on their social community server. For instance, a photo image 115 may be sent to SAS 104, which may analyze image 115 using techniques to determine that image 115 is of a skier, and therefore a sporty/skiing personality is how the user is represented to the friends social community.

A collective profile may be stored that represents the collective membership of each of the user's communities. As a collective representation of the community members, it is an aggregation of their individual profiles. For instance, it may be determined that many of the members of a sports team community (e.g., tennis team social community server) work in the same industry as user 101. Or that professional social community of user 101 may include many members who are on tennis teams.

Figure 2:
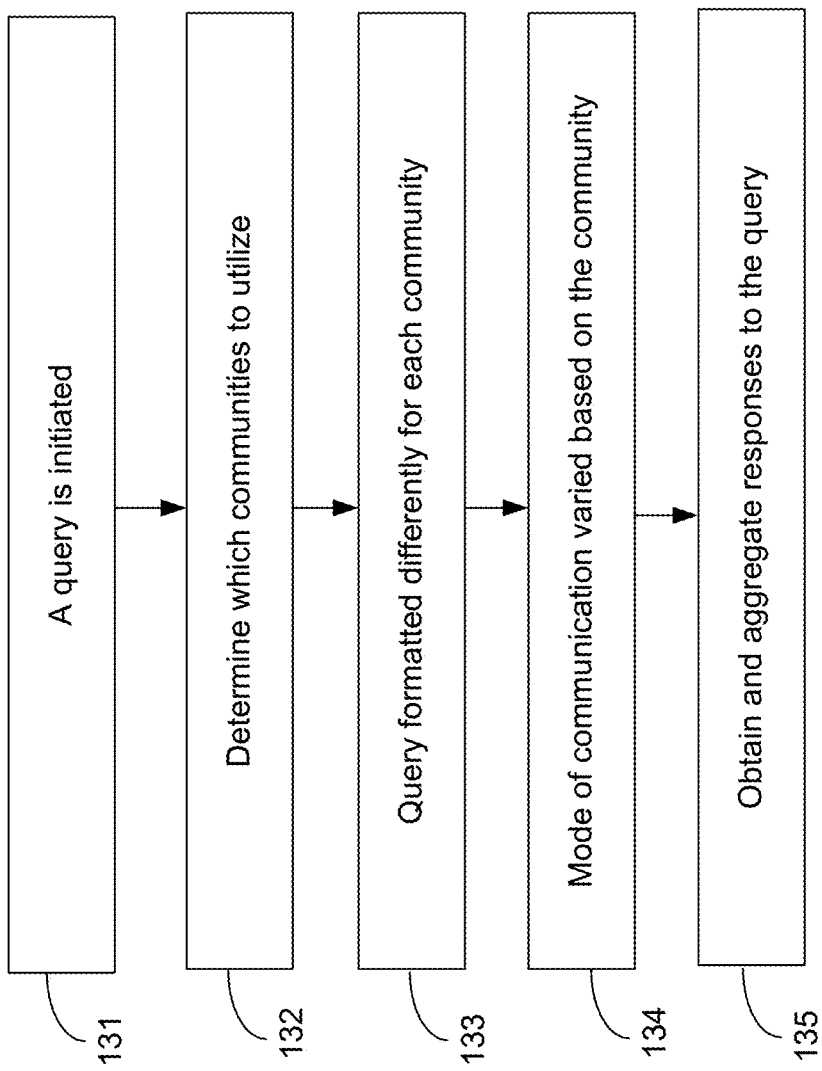
FIG. 2 illustrates an exemplary method associated with a social communities assistant.

FIG. 2 illustrates an exemplary method associated with social communities assistant. At step 131, obtain a query which may be associated with user 101. User 101 may send a query via mobile device 102 to the social communities assistant system. For example, user 101 may send a message like the following: "Ask my communities what type of tennis racket I should buy." User 101 may speak into mobile device 101 in order to create the message (e.g., use a virtual assistant application). At step 132, SAS 104 may determine which social communities to ask. This may be determined by matching text of the query and profile data (e.g., dynamic or static) with pertinent communities. For instance, SAS 104 may determine the social community by comparing the text of the query with data in the social communities profiles. Based on the "tennis" text SAS 104 may determine that the tennis team social community should be involved. Further, SAS 104 may compare the location of user 101 with location of other users of social communities and determine common social communities between user 101. In addition, other information may be considered, such as whether posts associated with "tennis" have been placed in the social community recently (e.g., within the last 30 days), number of other user profiles that posted sports-related content that included the other user, number of other user profiles that include tennis involvement (e.g., amateur or professional), among other things. Here, SAS 104 may determine that a message including the query should be sent to tennis team social community 111 and professional social community server 113 for general posting. Alternatively, it may be determined that the query should be sent directly only to members of the professional social community who are interested in tennis based on information in the individual member profiles.

With continued reference to FIG. 2, at step 133, SAS 104 may determine whether to format the query of step 132 differently based on each social community that was determined in step 132. For instance, if the profile data of user 101 indicates that user 101 should be represented in a manner that is casual to the tennis team social community, SAS 104 may format the question in a casual manner, e.g., "Hey guys, what kind of racket should I get?" Some of the words used in the social community post may be determined to be "casual" based on listing of words that is predetermined to be casual, but generally synonymous to the query user 101 would like to post. In addition, there may be predetermined words or phrases that are generally added (not necessarily synonymous) to indicate a casual tone. The profile data of user 101 may indicate that user 101 should be represented professionally to the professional social community. Accordingly, the question may be formatted in professional manner, which may be predetermined as just provided above. In this example, the query may be presented as the following: "I would appreciate your input on which of three possible tennis rackets I should purchase."

With continued reference to step 133, the nature of the query (e.g., question) may differ based on the social communities involved. For instance, if user 101 asks "Should I look for a new job?", artificial intelligence techniques may be used to first distinguish the intent of the query and then translate the query into the most appropriate format (e.g., context) for each community. If the SCA App determines that the professional social community and the friends social community are a match for career-related questions, SAS 104 may then refer again to how user 101 should be represented within each community. The professional social community may be searched for anyone in the professional social community (that is linked to user 101) who has posted a job listing, whereas the friends social community (that is linked to user 101) might receive the direct question as originally stated.

At step 134, SAS 104 may determine whether to vary the mode of communication based on the social community that was determined in step 132 or preferences of user 101, which may be within the profile data of user 101. For instance, the query may be sent as a direct text message (e.g., SMS text) to the members of the tennis team social community. In another example, based on the location of a member of the tennis team social community member as outside, the query may be provided as text and as audio (e.g., text to speech). In another example, the query (which may be a one sentence openly stated query—"How is everyone?") may be posted as a multiple-choice text survey or a graphics-enabled survey to the professional social community. The multiple-choice text survey may be based on choices provided in the query or may be based on the SAS 104 searching and discovering similar queries and using the most post popular choices (e.g., top 5) as answers for the survey. The survey may be "Yes/No/Maybe" or may have additional complexity, such as a query for the best restaurants in a location (e.g., a particular city or radius of location of user 101), may provide a list of restaurants that other social community members have posted about that are proximate to the location (e.g., within 10 miles).

At step 135, SAS 104 may obtain and aggregate responses to the query for user 101. The aggregate responses may combine the responses from more than one social community into a single response or otherwise reduced (e.g., summary) response. The aggregate responses may be presented to a display of mobile device 102 or voice enabled virtual assistant. For example, a speech, text, or graphics response may be created, which may be based on artificial intelligent techniques. Although the query may be posed broadly, the aggregate response may provide the top (e.g., top 3) similar responses, the most liked responses, or percentages associated with each top response. In an example, the aggregate response may be the following: "80% of your friends say go for a new job, but only 60% of your highly trusted friends agree. Your professional community indicates that the job market is hot for your skillset. Would you like to hear the top 3 job listings for you?" In another example, the aggregate response may be 80% congratulations and 20% complex responses (e.g., a complex response may have more than 10 words). In another example, the aggregate response may be 90% simple congratulatory responses (e.g., 5 words or less) and 10% individualized responses (e.g., mentions the name of user 101 and has 10 or more words). Further to this example, the individualized responses may be presented to user 101 via a display (or audio interface) of mobile device 102.

Figure 3:
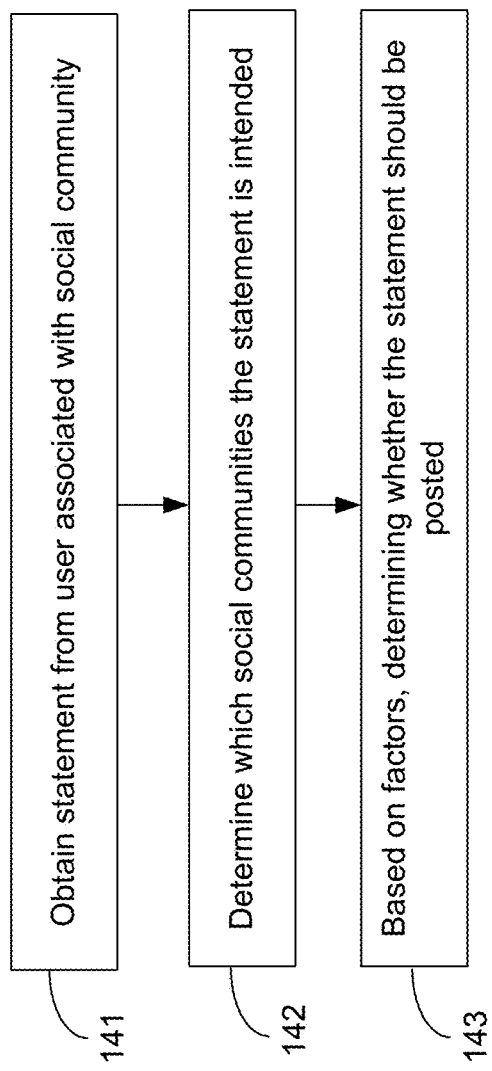
FIG. 3 illustrates an exemplary method associated with a social communities assistant.

FIG. 3 illustrates another exemplary method associated with social communities assistant. At step 141, obtain statement from user 101 associated with social community. For example, user 101 may use text or speech to enter a statement into the social communities assistant system. At step 142, SAS 104 may determine which social communities the statement of step 141 is intended for. This may be determined by matching text of the statement and profile data (e.g., dynamic or static) with pertinent communities. For instance, SAS 104 may determine the social community by comparing the text of the statement with data in the social communities profiles. At step 143, based on the statement and other information (e.g., factors), there is a determination of whether the statement should be shared. The profile data of user 101 may include information indicating what types of topics user 101 wants to share and an emotional threshold level for sharing. Types of topics may include relationship status (e.g., present, future, or past), job status (present, future, or past), politics, education status, location status, clothes status, kids status, or other topics, which may include events that occurred in the present (e.g., 30 minute window before or after expected time of post), hope to occur in the future (e.g., one or more days after the expected time of post), or past (e.g., one or more previous days from the expected time of post).

Emotional level of user 101 may be determined based on factors, such as tone of user 101 (e.g., tone of speech audio), use of exclamations in text, use of capital letters in text, the type of event described (e.g., birth, death, or divorce), or keyword matches, among other things. The aforementioned factors may be consolidated into a numerical level of emotional status and based on this numerical level it may assist in determining whether an emotional threshold level has been reached. For instance, user 101 may state to via a virtual assistant: "I need a new girlfriend!" SAS 104 may determine the intent and the user's emotion based on artificial intelligence analysis of the content and an emotion detection analysis of the speech file, using speech analysis techniques. As a result, SAS 104 may determine that the context and emotional level are out of the emotional threshold level for sharing. SAS 104 may communicate via mobile device 102 or device 103 to user 101: "Are you sure you want to share this?" User 101 may confirm via mobile device 102 or device 103 and based on the additional obtained response from user 101, determine whether to share the statement as a post to the determined social communities of step 142. SAS 104 may automatically restrict the posting of a statement without providing an alert beforehand.

Disclosed in more detail below are additional aspects and further considerations associated with the social communities assistant system. Another aspect in which the social communities assistant may assist is in the notification of events or locations to multiple communities. User 101 may speak "Post that I'm in San Francisco," into device 103. Based on the this language and profile data, SAS 104 may determine that posts associated with the location of user 101 when the location is out of town (e.g., 100 miles or more from the residence of user 101) should only be provided to other members of social communities that reside or are currently located within a city limit or within proximity (e.g., 20 mile radius) of user 101. In addition, based on profile data of user 101 there may be certain trusted members that may obtain a location or event post from user 101. For instance, a resulting post may be to trusted members of neighborhood social community and members of professional social community who are located in the San Francisco area.

Purchases of items, particularly items associated with an event, may be automatically posted to one or more social communities based on profile data, as disclosed herein. In an example, SAS 104 may detect that user 101 bought tickets (e.g., based on a notification from a retail server) to a tennis tournament. A determination may be made by SAS 104 to post this event to the tennis team social community based on data in the collective tennis team social community profile indicating "alert subscriber of tennis-related purchases."

The combination of a location and a scheduled event may determine whether a posting should occur. In another example, SAS 104 may be notified (based on the location of mobile device 102 and an electronic calendar of user 101 or neighborhood social community) that user 101 is at a neighborhood homeowners association meeting and post an alert of user 101's presence at the meeting to just the neighborhood social community.

It is contemplated herein that a message (e.g., post) generally goes to those who are linked/friends of user 101 unless otherwise indicated. In addition, it is contemplated that the functions (e.g., steps of FIG. 2 or FIG. 3) may be performed by a single device (e.g., mobile device 102, device 103, SAS 104, or neighborhood social community server 110) or distributed over a plurality of devices (e.g., mobile device 102, device 103, SAS 104, or neighborhood social community server 110). It is further contemplated that messages (e.g., posts) may be sent from mobile device 102 (or SAS 104) to any one of the social community servers for posting as disclosed herein.

Figure 4:
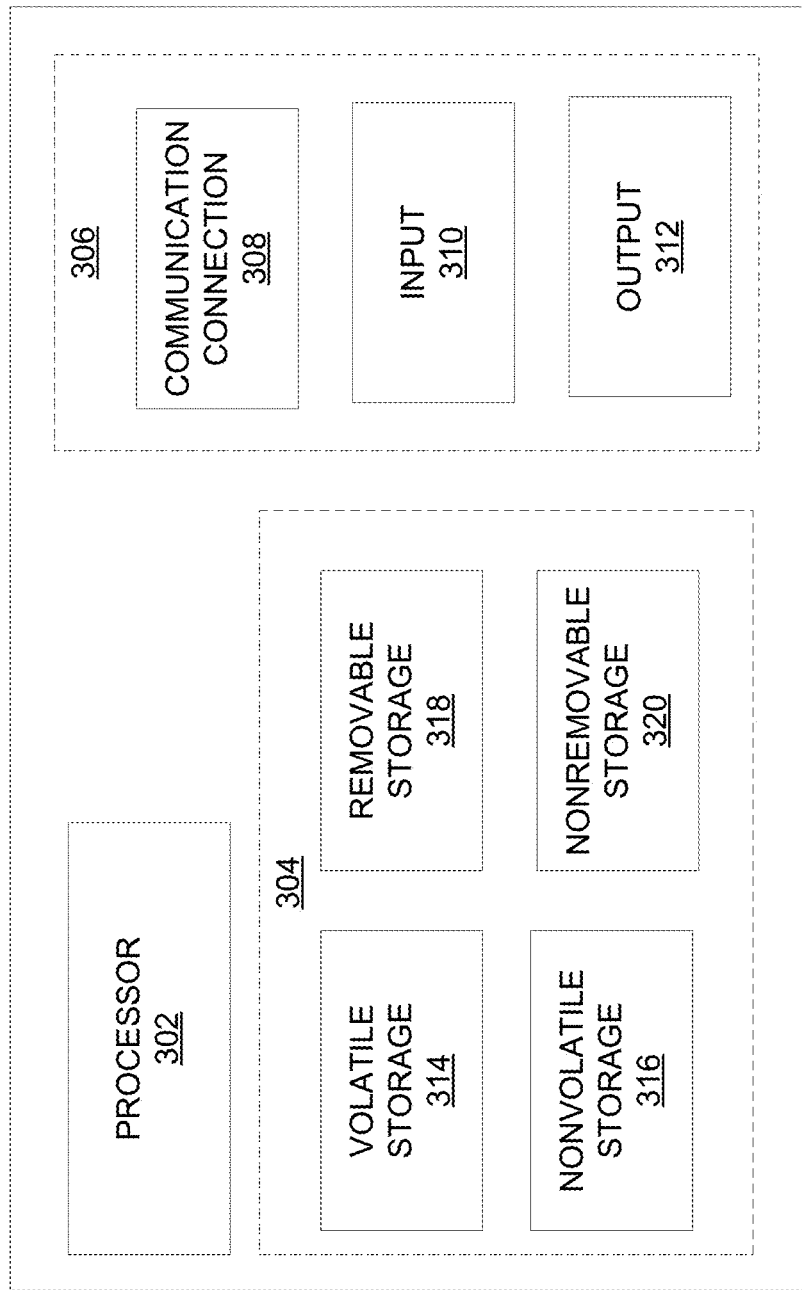
FIG. 4 illustrates a schematic of an exemplary network device.

FIG. 4 is a block diagram of network device 300 that may be connected to or comprise a component of FIG. 1. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
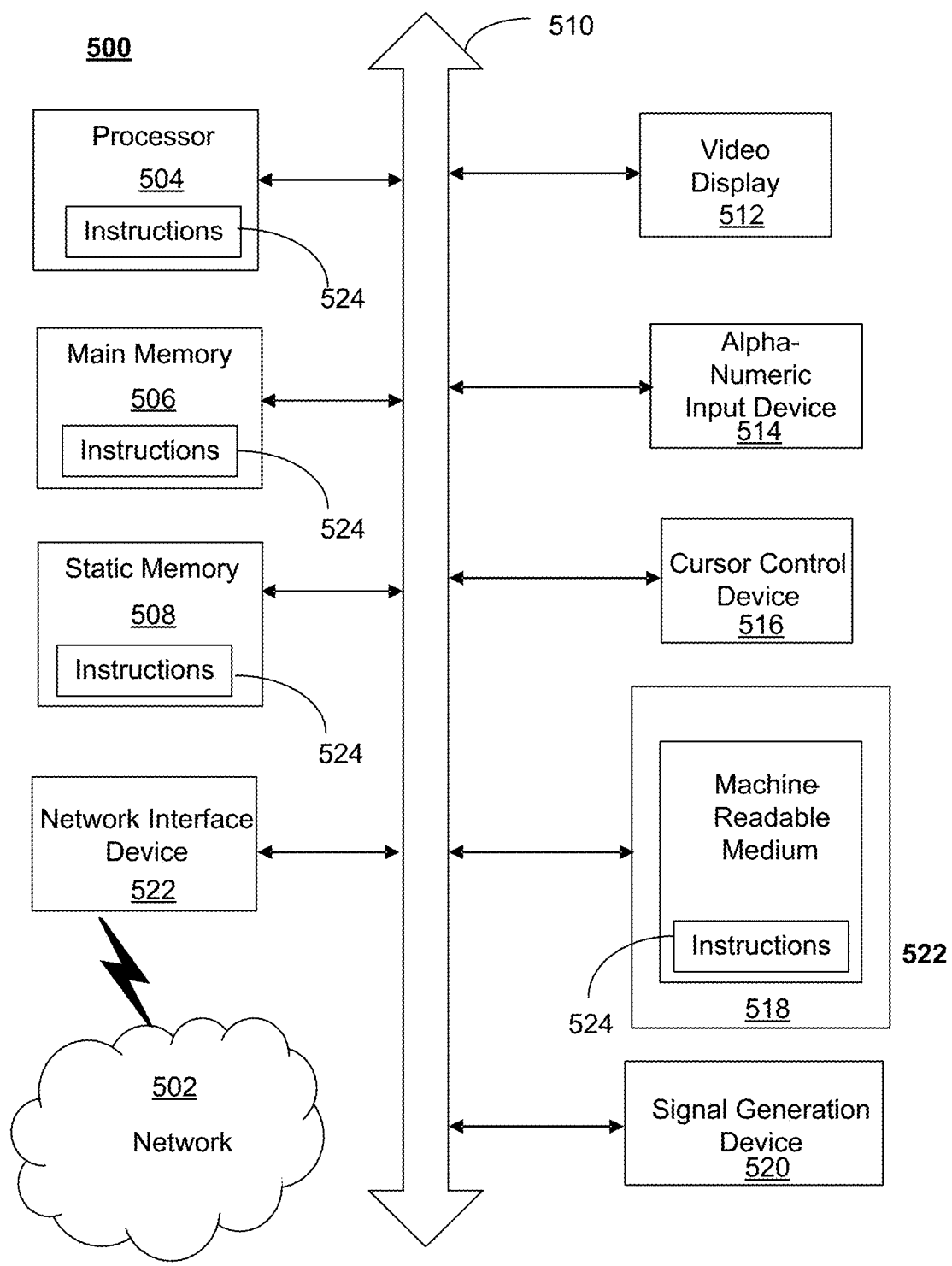
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 102, device 103, server 110-server 113, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which the social communities assistant system can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—the social communities assistant system—as illustrated in the Figures, specific terminology is employed for the sake of clarity. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing a plurality of social communities. A method, system, computer readable storage medium, or apparatus provides for obtaining first information for posting on a plurality of social community servers, wherein the plurality of social community servers comprises different types of social media, wherein a profile of a user is associated with each of the plurality of social community servers; obtaining second information associated with the profile of the user, wherein the second information comprises location of a mobile device associated with the user; based on the first information and the second information, determining a subset of the plurality of social community servers for the posting; and providing instructions to post the first information to the subset of the plurality of social community servers. A method, system, computer readable storage medium, or apparatus may include based on the first information, the second information, and the subset of the plurality of social community servers, determining whether the first information should be posted as a casual post or a professional post to the respective social community servers of the subset; and based on the determining of whether the first information should be posted as a casual post or a professional post to the respective social community servers of the subset, formatting the post to each respective social community server in a manner that is social or casual. The casual post or the professional post may include significantly different text (e.g., at least 30% of the terminology is different from the first information) or graphics. A method, system, computer readable storage medium, or apparatus may determine whether the first information comprises a query; and based on the first information comprising a query, alter the format of the post to be different from a statement or an event notification. A method, system, computer readable storage medium, or apparatus may determine whether the first information comprises a statement; and based on the first information comprising a statement, alter the format of the post to be different from a query or event notification. A method, system, computer readable storage medium, or apparatus may include determining whether the first information includes an event notification associated with the location of the mobile device of the user; and based on the first information including an event notification associated with the location of the mobile device of the user, altering the format of the post of the first information. All combinations in this paragraph and the following paragraph (including the removal or addition of steps) are contemplated in a manner that is consistent with the other portions of the detailed description.

A method, system, computer readable storage medium, or apparatus provides for obtaining first information associated with posting on a plurality of social community servers, wherein the plurality of social community servers comprises different types of social media, wherein a profile of a user is associated with each of the plurality of social community servers; obtaining second information associated with the profile of the user, wherein the second information comprises location of a mobile device associated with the user; based on the first information and the second information, determining a subset of the plurality of social community servers for the posting; and sending the posting associated with the first information to the subset of the plurality of social community servers. The posting may include parts of the first information or the first information in different text or graphic formats. A method, system, computer readable storage medium, or apparatus may include based on the first information, the second information, and each respective social community server of the subset of the plurality of social community servers, providing instructions to send a direct text message to each member that is linked to the profile of the user of each respective social community server. A method, system, computer readable storage medium, or apparatus may include determining whether the first information comprises a query; and based on the first information including a query, altering the format of the post in a manner that displays a survey associated with the query. A method, system, computer readable storage medium, or apparatus may include determining whether the first information include a query; obtaining a plurality of responses to the post; based on the first information including a query and the obtaining of the plurality of responses to the post, generating an aggregate response; and providing the aggregate response to a display of the mobile device associated with the user. The determining a subset of the plurality of social community servers for the posting is further based on an appointment of electronic calendar of member of the plurality of social community servers. A method, system, computer readable storage medium, or apparatus may include determining whether the first information comprises a statement; and based on the first information comprising a statement, determining an emotional level of the statement; and based on the emotional level of the statement reaching an emotional threshold level, sending an alert. The emotional level may be based on keywords in the statement that are given a numerical value corresponding to an emotional level. A method, system, computer readable storage medium, or apparatus may include sending a direct text message to each member that is linked to the profile of the user associated with each respective social community server. All combinations in this paragraph and the below paragraph (including the removal or addition of steps) are contemplated in a manner that is consistent with the other portions of the detailed description.

A method, system, computer readable storage medium, or apparatus provides for obtaining information for posting on a plurality of social community servers, wherein profile data for a user is associated with each of the plurality of social community servers; based on the information and the profile data, determining one or more of the social community servers for the posting; based on the information and the profile data, altering a format of a first post so that it is different from the format of at least one other post; and providing instructions to post the first post. The information may include a query or a statement. The first post displays a survey associated with the query. The method, system, computer readable storage medium, or apparatus provides for obtaining a plurality of responses to the first post; based on the plurality of responses to the first post, generating an aggregate response; and providing the aggregate response to a display of a mobile device associated with the user. The method, system, computer readable storage medium, or apparatus provides for determining whether the information comprises an event notification associated with a location of the mobile device of the user; and based on the information comprising an event notification associated with the location of the mobile device of the user, further altering the format of the first post. The method, system, computer readable storage medium, or apparatus provides for determining whether the information comprises a statement; and based on the information comprising a statement, determining an emotional level of the statement; and based on the emotional level of the statement reaching an emotional threshold level, sending an alert to a mobile device of the user. The emotional level may be based on keywords in the statement. The determining one or more of the social community servers for the posting is further based on an appointment of an electronic calendar of a member of the plurality of social community servers. A method, system, computer readable storage medium, or apparatus provides for obtaining information for posting on a plurality of social community servers, wherein profile data for a user is accessible by each of the plurality of social community servers; based on the information and the profile data, determining one or more of the social community servers for the posting; based on the information and the profile data, altering a format of a first post so that the format thus altered is different from the format of at least one other post; and providing instructions to post the first post with the altered format. The disclosed subject may focus on the activity (e.g., context) of the user, the activity can also play a factor in which social network subject matter is posted to (e.g. at work but talking about children's ballet class may not be the same as at work talking about latest manager's announcement). All combinations in this paragraph and the above paragraphs (including the removal or addition of steps) are contemplated in a manner that is consistent with the other portions of the detailed description.

What is claimed:

1. An apparatus comprising:
a processor; and
a memory coupled with the processor, the memory storing executable instructions that when executed by the processor cause the processor to effectuate operations comprising:
providing a user interface application for execution by a mobile device associated with a user, wherein the user interface application functions as a proxy that manages parallel communications between the user and a plurality of social community servers;
obtaining, from the user interface application executed by the mobile device, information for posting on the plurality of social community servers, wherein the information comprises a query posed to members of one or more of the plurality of social community servers, and wherein profile data for the user is accessible by each of the plurality of social community servers;
determining whether the information comprises a statement;
based on the information comprising a statement, determining an emotional level of the statement; and
based on the emotional level of the statement reaching an emotional threshold level, sending an alert to the mobile device of the user, wherein the emotional threshold level is a numerical value determined based on different types of factors;
based on the information and the profile data, determining one or more of the plurality of social community servers for the posting;
based on the information and the profile data, defining a first format of a post comprising the query for a first social community server of the plurality of social community servers that is different from a second format of the post for a second social community server of the plurality of social community servers, wherein the defining the first format comprises using the processor to execute an artificial intelligence (AI) algorithm to perform an analysis of the profile data and to determine, based on the analysis of the profile data, a first manner of representation to be used for the user with respect to the first social community server, and wherein the first manner of representation relates to expressing communications in a determined casual tone;
based on the information and the profile data, and after the sending the alert to the mobile device, defining the second format of the post for the second social community server, wherein the defining the second format comprises using the processor to execute the AI algorithm to determine, based on the analysis of the profile data, a second manner of representation to be used for the user with respect to the second social community server, and wherein the second manner of representation relates to expressing communications in a determined professional tone; and
providing instructions to cause the post in the first format to be transmitted to the first social community server and the post in the second format to be transmitted to the second social community server, wherein the post in the first format is transmitted to members of the first social community server as a text-based message, and wherein, based on a determination that a particular member of the first social community server is located at a particular location, the post in the first format is transmitted to the particular member additionally as an audio-based message.

2. The apparatus of claim 1, wherein the post in the second format is transmitted to members of the second social community server as a text-based message, and wherein, based on a determination that a certain member of the second social community server is located at a certain location, the post in the second format is transmitted to the certain member additionally as an audio-based message.

3. The apparatus of claim 1, wherein the post in the first format is displayed as a survey associated with the query.

4. The apparatus of claim 1, the operations further comprising:
obtaining a plurality of responses to the post in the first format;
based on the plurality of responses to the post in the first format, generating an aggregate response; and
providing the aggregate response to a display of the mobile device associated with the user.

5. The apparatus of claim 1, the operations further comprising:
determining whether the information comprises an event notification associated with a location of the mobile device of the user; and
based on the information comprising an event notification associated with the location of the mobile device of the user, altering the first format of the post.

6. The apparatus of claim 1,
wherein the post in the second format is displayed as a survey associated with the query.

7. The apparatus of claim 1, the operations further comprising:
obtaining a plurality of responses to the post in the second format;
based on the plurality of responses to the post in the second format, generating an aggregate response; and
providing the aggregate response to a display of the mobile device associated with the user.

8. The apparatus of claim 1, wherein the determining one or more of the plurality of social community servers for the posting is further based on an appointment of an electronic calendar of a member of the plurality of social community servers.

9. A system comprising:
a mobile device associated with a user; and
a server communicatively connected with the mobile device, the server comprising:
a processor; and
a memory coupled with the processor, the memory storing executable instructions that when executed by the processor cause the processor to effectuate operations comprising:
providing a user interface application for execution by the mobile device, wherein the user interface application functions as a proxy that manages parallel communications between the user and a plurality of social community servers;
obtaining, from the user interface application executed by the mobile device, information for posting on the plurality of social community servers, wherein the information comprises a query posed to members of one or more of the plurality of social community servers, and wherein profile data for the user is accessible by each of the plurality of social community servers;
determining whether the information comprises a statement;
based on the information comprising a statement, determining an emotional level of the statement;
based on the emotional level of the statement reaching an emotional threshold level, sending an alert to the mobile device of the user, wherein the emotional threshold level is a numerical value determined based on different types of factors;
based on the information and the profile data, determining one or more of the plurality of social community servers for the posting;
based on the information and the profile data, identifying a first format of a post comprising the query for a first social community server of the plurality of social community servers that is different from a second format of the post for a second social community server of the plurality of social community servers, wherein the identifying the first format comprises using the processor to execute an artificial intelligence (AI) algorithm to perform an analysis of the profile data and to determine, based on the analysis of the profile data, a first manner of representation to be used for the user with respect to the first social community server, and wherein the first manner of representation relates to expressing communications in a determined casual tone;
based on the information and the profile data, and after the sending the alert to the mobile device, defining the second format of the post for the second social community server, wherein the defining the second format comprises using the processor to execute the AI algorithm to determine, based on the analysis of the profile data, a second manner of representation to be used for the user with respect to the second social community server, and wherein the second manner of representation relates to expressing communications in a determined professional tone; and
providing instructions to cause the post in the first format to be transmitted to the first social community server and the post in the second format to be transmitted to the second social community server, wherein the post in the first format is transmitted to members of the first social community server as a text-based message, and wherein, based on a determination that a particular member of the first social community server is located at a particular location, the post in the first format is transmitted to the particular member additionally as an audio-based message.

10. The system of claim 9, wherein the determining one or more of the plurality of social community servers for the posting is further based on an appointment of an electronic calendar of a member of the plurality of social community servers.

11. The system of claim 9,
wherein the post in the second format is displayed as a survey associated with the query.

12. The system of claim 9, wherein the post in the first format is displayed as a survey associated with the query.

13. The system of claim 9, the operations further comprising:
obtaining a plurality of responses to the post in the first format;
based on the plurality of responses to the post in the first format, generating an aggregate response; and
providing the aggregate response to a display of the mobile device associated with the user.

14. The system of claim 9, wherein the information comprises an action of the user and a location of the user.

15. The system of claim 9, the operations further comprising:
obtaining a plurality of responses to the post in the second format;
based on the plurality of responses to the post in the second format, generating an aggregate response; and
providing the aggregate response to a display of the mobile device associated with the user.

16. A method comprising:
providing a user interface application for execution by a mobile device associated with a user, wherein the user interface application functions as a proxy that manages parallel communications between the user and a plurality of social community servers;
obtaining, from the user interface application executed by the mobile device, information for posting on the plurality of social community servers, wherein the information comprises a query posed to members of one or more of the plurality of social community servers, and wherein profile data for the user is accessible by each of the plurality of social community servers;

determining whether the information comprises a statement;

based on the information comprising a statement, determining an emotional level of the statement;

based on the emotional level of the statement reaching an emotional threshold level, sending an alert to the mobile device of the user, wherein the emotional threshold level is a numerical value determined based on different types of factors;

based on the information and the profile data, determining one or more of the plurality of social community servers for the posting;

based on the information and the profile data, determining a first format of a post comprising the query for a first social community server of the plurality of social community servers that is different from a second format of the post for a second social community server of the plurality of social community servers, wherein the determining the first format comprises using a processor to execute an artificial intelligence (AI) algorithm to perform an analysis of the profile data and to determine, based on the analysis of the profile data, a first manner of representation to be used for the user with respect to the first social community server, and wherein the first manner of representation relates to expressing communications in a determined casual tone;

based on the information and the profile data, and after the sending the alert to the mobile device, defining the second format of the post for the second social community server, wherein the defining the second format comprises using the processor to execute the AI algorithm to determine, based on the analysis of the profile data, a second manner of representation to be used for the user with respect to the second social community server, and wherein the second manner of representation relates to expressing communications in a determined professional tone; and providing instructions to cause the post in the first format to be transmitted to the first social community server and the post in the second format to be transmitted to the second social community server, wherein the post in the first format is transmitted to members of the first social community server as a text-based message, and wherein, based on a determination that a particular member of the first social community server is located at a particular location, the post in the first format is transmitted to the particular member additionally as an audio-based message.

17. The method of claim 16, further comprising:
obtaining a plurality of responses to the post in the first format;
based on the plurality of responses to the post in the first format, generating an aggregate response; and
providing the aggregate response to a display of the mobile device associated with the user.

18. The method of claim 16, further comprising:
determining whether the information comprises an event notification associated with a location of the mobile device of the user; and
based on the information comprising an event notification associated with the location of the mobile device of the user, altering the first format of the post.

19. The method of claim 16, wherein each of the post in the first format and the post in the second format is displayed as a survey associated with the query.

20. The method of claim 16, wherein the determining one or more of the plurality of social community servers for the posting is further based on an appointment of an electronic calendar of a member of the plurality of social community servers.

* * * * *